United States Patent Office 3,308,311
Patented Mar. 7, 1967

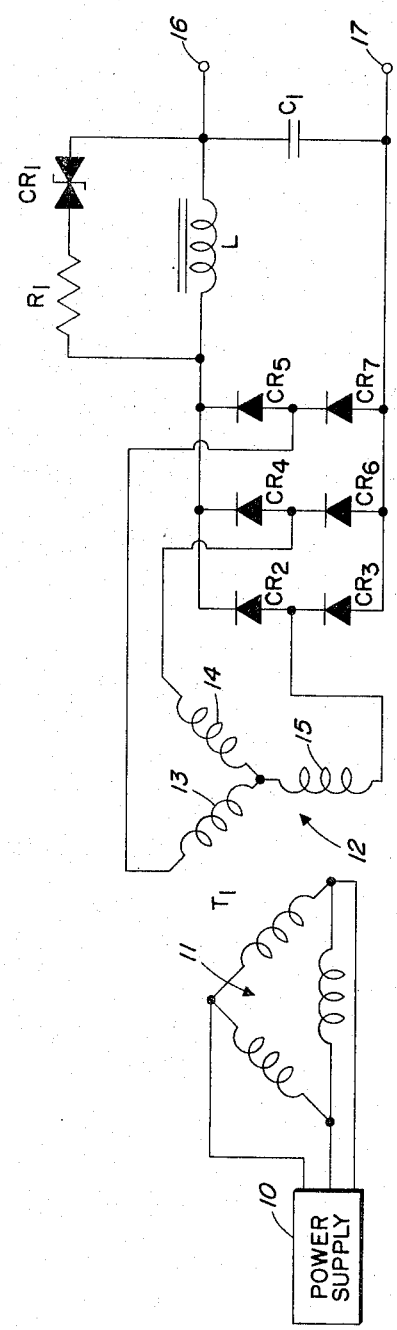

3,308,311
TRANSIENT SUPPRESSION CIRCUIT
Hilmer I. Swanson, Cedar Rapids, Iowa, assignor to Collins Radio Company, Cedar Rapids, Iowa, a corporation of Iowa
Filed Jan. 21, 1964, Ser. No. 339,135
3 Claims. (Cl. 307—93)

This invention relates in general to a protective circuit and in particular to a circuit for protecting a power supply from high voltage transients.

At various times lightning or other transients will feed into the power supplies of high power transmitters and disable them by burning out the rectifier elements.

It is an object of this invention to provide a protective circuit for a power supply in which such transients are limited to a maximum value.

Another object of this inventon is to provide an improved transient suppressing circuit.

A feature of this invention is found in the provision of a pair of back-to-back diodes and a resistor across the choke of a filter in a power supply so as to prevent the choke voltage from exceeding a desired level.

Further features, objects and advantages of the invention will become apparent from the following description and claims when read in view of the drawing in which:

The figure is a schematic illustration of a transient suppression circuit according to this invention.

The figure illustrates an A.-C. three-phase power supply 10 which is connected to the primary 11 of a transformer $T_1$. The secondary 12 of transformer $T_1$ has windings 13, 14 and 15 that might be connected in Y. A first pair of diodes $CR_2$ and $CR_4$ are connected between windings 14 and 15. A second pair of diodes $CR_3$ and $CR_6$ are also connected between the windings 14 and 15. The diode $CR_5$ is connected between winding 13 and diode $CR_4$. Another diode $CR_7$ is connected between winding 13 and diode $CR_6$. A filter is connected to the output of the diodes and comprises an inductor L and condenser $C_1$. Output terminals 16 and 17 are connected across condenser $C_1$.

A resistor $R_1$ and a back-to-back diode $CR_1$ is connected across the inductor L. The back-to-back diode $CR_1$ may be a General Electric thyrector element.

The structure shown in the figure utilizes a thyrector element which has a breakdown voltage greater than the transformer output voltage.

In any transient suppression scheme, the objective is to short out the transient pulses. However, in a choke input filter, the choke presents a very high impedance to the pulses and thus allows full transient voltage to be built up across the rectifier diodes. If the choke could be made to look like a short circuit rather than an open circuit the pulses would be shorted out by the large filter capacitor $C_1$. The back-to-back zener diode $CR_1$ allows the transients to see a low impedance across the choke L. The zener need only have a breakdown voltage slightly larger than the desired operating voltage across the choke. Thus, with the filter capacitor $C_1$ essentially a short circuit, transients are limited to the zener voltage. The resistor $R_1$ limits zener current to a safe value during turn on.

In a particular circuit using a GE 3D3 thyrector (back-to-back zeners rated at approximately 300 volts, maximum current 30 amps) and a 33 ohm resistor $R_1$ across the choke, transients were cut from 1450 volts to under 500 volts. Another circuit was constructed with two 3D3 thyrectors in parallel and each with 16.5 ohm resistors in series connected across the choke. In such circuit the transient voltages were reduced to under 350 volts.

The method shown in the figure is far superior to RC networks or standard zener configurations for transient suppression in three-phase supplies. It is inexpensive, independent of transformer characteristics, and pulse shape. The system is inherently fail-safe since a shorted or open thyrector $CR_1$ will not adversely affect normal power supply operation.

It is seen that this invention results in an improved method of protecting high voltage circuits from transients. Although this invention has been described with respect to a particular embodiment it is not to be so limited, as changes and modifications may be made therein which are within the spirit and scope of the invention as defined by the appended claims.

I claim:

1. A transient suppression circuit for a power supply comprising rectifying means receiving alternating current, a filter connected to the rectifying means to smooth the rectified current, said filter having a choke, and back-to-back diodes connected across said choke, the breakdown voltage of said diodes slightly exceeding the desired maximum voltage across said choke so that said diodes limit the voltage across the choke to the operating range of said choke.

2. A transient suppression circuit for a power supply comprising rectifying means receiving alternating current, a filter connected to the rectifying means to smooth the rectified current, said filter having a choke, a resistor, and back-to-back zener diodes connected in series with the resistor and the combination connected across said choke, the breakdown voltage of said diodes slightly exceeding the maximum permissible voltage across said choke to limit its voltage to the operating range.

3. In apparatus according to claim 2 wherein the filter has a capacitor as well as the choke.

References Cited by the Examiner
UNITED STATES PATENTS

| | | | |
|---|---|---|---|
| 1,547,242 | 7/1925 | Strieby | 307—105 X |
| 1,725,709 | 8/1929 | Geiger | 321—10 |
| 1,829,254 | 10/1931 | Asch | 321—10 X |
| 1,966,077 | 7/1934 | Nyman | 307—105 X |
| 2,241,831 | 5/1941 | Wahlquist | 307—105 |
| 3,118,102 | 1/1964 | Cable | 317—16 X |

ORIS L. RADER, *Primary Examiner.*

T. J. MADDEN, *Assistant Examiner.*